US006463521B1

(12) United States Patent
Long (10) Patent No.: US 6,463,521 B1
(45) Date of Patent: Oct. 8, 2002

(54) OPCODE NUMBERING FOR META-DATA ENCODING

(75) Inventor: Dean R. E. Long, Boulder Creek, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/338,875

(22) Filed: Jun. 23, 1999

(51) Int. Cl.[7] .............................. G06F 9/44; G06F 9/45; G06F 9/54
(52) U.S. Cl. ...................... 712/213; 712/209; 712/211; 712/227; 717/118; 717/159; 717/166; 717/148
(58) Field of Search ................................ 712/221, 258, 712/209, 41, 210, 42, 211, 207, 212, 206, 213, 217, 719, 23, 24, 227, 242, 226, 243, 223, 245, 224, 246, 230, 247, 240, 248, 237, 300, 235, 250, 200; 709/331, 315, 314, 332, 108, 106, 107, 320, 328, 330, 310; 717/2, 3, 4, 56, 115, 117, 116, 165, 7, 8, 9, 10, 11, 118, 122, 114, 136, 159, 166, 148; 710/3; 703/26, 23, 27; 707/200, 201, 202, 203, 103 R, 103 Y, 103 XZ, 104.1, 205

(56) References Cited

U.S. PATENT DOCUMENTS

| | | | | |
|---|---|---|---|---|
| 4,802,085 A | * | 1/1989 | Levy et al. ..................... 710/3 |
| 5,303,362 A | | 4/1994 | Butts et al. ................. 395/425 |
| 5,317,740 A | * | 5/1994 | Sites ............................. 709/37 |
| 5,355,472 A | | 10/1994 | Lewis ........................ 395/600 |
| 5,402,368 A | | 3/1995 | Yamada et al. ............. 364/736 |
| 5,408,670 A | | 4/1995 | Davies ....................... 395/800 |
| 5,463,746 A | | 10/1995 | Brodnax et al. ............ 395/375 |
| 5,636,352 A | | 6/1997 | Bealkowski et al. ........ 395/384 |
| 5,638,524 A | * | 6/1997 | Kiuchi et al. ............... 712/221 |
| 5,696,936 A | | 12/1997 | Church et al. .............. 395/465 |
| 5,778,233 A | | 7/1998 | Besaw et al. ............... 395/709 |
| 5,787,431 A | | 7/1998 | Shaughnessy ............... 707/100 |
| 5,835,712 A | | 11/1998 | DuFresne ................... 395/200 |
| 5,838,965 A | | 11/1998 | Kavanagh et al. .......... 395/614 |
| 5,905,895 A | | 5/1999 | Halter ........................ 395/709 |
| 5,913,064 A | | 6/1999 | Chen ......................... 395/702 |

FOREIGN PATENT DOCUMENTS

EP 1 063 585 12/2000

OTHER PUBLICATIONS

Czajkowski, et al., "Jres: A Resource Accounting Interface for Java", Oct. 1998, Proceedings of the 1998 ACM OOPSLA Conference, Vancouver, BC.

* cited by examiner

*Primary Examiner*—Daniel H. Pan
(74) *Attorney, Agent, or Firm*—Thelen Reid & Priest LLP; John P. Schaub (57) ABSTRACT

A method for including opcode information in an opcode includes numbering the opcode such that a property of the opcode is represented by at least one bit of the opcode. According to one aspect, the number of data units required to advance to the next opcode is encoded into the opcode value itself. According to another aspect, opcodes are numbered such that opcodes having the same properties have opcode values in the same opcode range.

22 Claims, 8 Drawing Sheets

$$common\_invoke:$$
$$length = *pc >> 5;$$

|  | Default opcode |  | New opcode |
|---|---|---|---|
| invoke interface | x B9 | Renumber | x 60 — 70 |
| invoke static | x B8 | ⟶ | x A0 — 72 |

90 — #define is Exc(opcode)(opcode<B) /*++ p<>=0 omitted*/
92 — #define is Gc(opcode)(opcode << ++ opcode >=A)
94 — #define is Br(opcode)(opcode>=D) /*++opcode<N omitted*/

OPCODE NUMBERING FOR META-DATA ENCODING

BACKGROUND OF THE INVENTION

1. Field of the Invention

The present invention relates to computer systems. More particularly, the present invention relates to opcode numbering for meta-data encoding.

2. Background

A known problem for software developers and computer users is the lack of portability of software across operating system platforms. As a response to this concern, the Java™ programming language was developed at Sun Microsystems as a platform independent, object oriented computer language.

Figure 1:
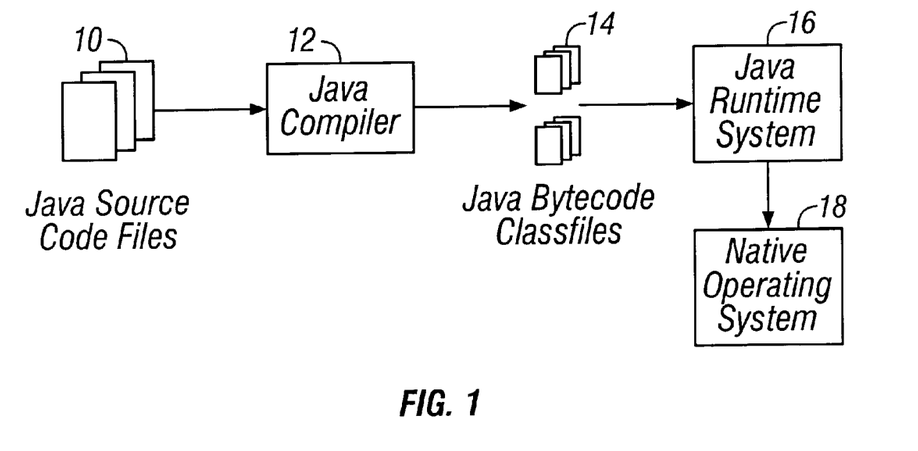
FIG. 1 is a block diagram that illustrates a typical Java™ system.

Java™ achieves its operating system independence by being both a compiled and interpreted language. The way in which this independence is achieved is illustrated in FIG. 1. First, Java™ source code 10, which consists of Java™ classfiles, is compiled into a generic intermediate format called Java™ bytecode 14. Java™'s bytecodes consist of a sequence of single byte opcodes, each of which identify a particular operation to be carried out. Additionally, some of the opcodes have parameters. For example, opcode number 21, iload <varnum>, takes the single-word integer value stored in the local variable, varnum, and pushes it onto a stack.

Next, the bytecodes 14 are interpreted by a Java™ Virtual Machine (JVM) 16. The JVM executes the bytecodes, either by interpreting them or by compiling them to native machine code and then executing the compiled code. The JVM 16 is a stacked-based implementation of a "virtual" processor that shares many characteristics with physical microprocessors. The bytecodes 14 executed by the JVM 16 are essentially a machine instruction set, and as will be appreciated by those of ordinary skill in the art, are similar to the assembly language of a computing machine. Accordingly, every hardware platform or operating system may have a unique implementation of the JVM 16, called a Java™ Runtime System, to route the universal bytecode calls to the underlying native system 18.

Although Java™ provides portability through bytecodes, Java™ programs lag natively compiled programs, written in languages like C/C++, in their execution time. When a user activates a Java program on a Web Page, the user must wait not only for the program to download but also to be interpreted. To improve Java™'s execution time, optimizations can be introduced into the processing of Java™ bytecodes 14. These optimizations can be implemented in a variety of manners including as Stand-Alone Optimizers (SAOs) or as part of Just-in-Time (JIT) compilers.

A SAO transforms an input classfile containing bytecode 14 into an output classfile containing bytecodes that more efficiently perform the same operations. A JIT transforms an input classfile containing bytecode 14 into an executable program. Prior to the development of JITs, a JVM 16 would step through all the bytecode instructions in a program and mechanically perform the native code calls. With a JIT compiler, however, the JVM 16 first makes a call to the JIT which compiles the instructions into native code that is then run directly on the native operating system 18. The JIT compiler permits natively complied code to run faster and makes it so that the code only needs to be compiled once. Further, JIT compilers offer a stage at which the executable code can be optimized.

Increasing demands on computers in general create an incentive to optimize the speed and efficiency of program execution. The run time nature of Java™-like systems provides a significant additional incentive for such optimizations. Accordingly, a need exists in the prior art for a method for optimizing program execution.

BRIEF DESCRIPTION OF THE INVENTION

A method for including opcode information in an opcode includes numbering the opcode such that a property of the opcode is represented by at least one bit of the opcode. According to one aspect, the number of data units required to advance to the next opcode is encoded into the opcode value itself. According to another aspect, opcodes are numbered such that opcodes having the same properties have opcode values in the same opcode range.

DETAILED DESCRIPTION OF THE PREFERRED EMBODIMENTS

Those of ordinary skill in the art will realize that the following description of the present invention is illustrative only. Other embodiments of the invention will readily suggest themselves to such skilled persons having the benefit of this disclosure.

This invention relates to computer systems. More particularly, the present invention relates to opcode numbering for meta-data encoding. The invention further relates to machine readable media on which are stored (1) the layout parameters of the present invention and/or (2) program instructions for using the present invention in performing operations on a computer. Such media includes by way of example magnetic tape, magnetic disks, optically readable media such as CD ROMs and semiconductor memory such as PCMCIA cards. The medium may also take the form of a portable item such as a small disk, diskette or cassette. The medium may also take the form of a larger or immobile item such as a hard disk drive or a computer RAM.

According to the present invention, opcodes are numbered such that one or more properties of an opcode are encoded within the opcode itself. The present invention enables optimizations by allowing applications such as interpreters to use the information encoded within the opcode, rather than executing additional instructions to obtain the same information from another source.

Although the opcode numbering described herein is described with reference to Java™ bytecodes, the invention has a broader scope. The description of Java™ is done merely for illustrating possible applications of the present invention. Those of ordinary skill in the art will recognize that the invention could be applied to opcodes of various sizes and of various languages, generated for any program to be executed on a computer.

An operand is the part of an instruction that references data to be acted upon. An operation code (opcode) is the part of an instruction that tells the computer what to do, such as input, add or branch. The opcode is the verb; the operands are the nouns. For example, in the instruction iadd value1 value2, value1 and value2 are the operands and iadd is the opcode.

Typically, opcodes are assigned numbers fairly arbitrarily. The opcode number serves no purpose other than to uniquely identify an opcode. Such was the case with Java™. When developing the Java™ bytecode instruction set, the designers sought to ensure that it was simple enough for hardware optimization. A unique eight-bit number identified each Java™ opcode.

Each opcode has properties that are inherently associated with the opcode. These properties are referred to as "meta-data". One example of opcode meta-data is the opcode length, which is the number of data units required to advance to the next opcode. Another example of opcode meta-data is the type of comparison for a "compare" opcode. Some examples of types of comparisons include "greater than", "less than" and "equal to".

TABLE 1

| default opcode = xB9 (185) |
| --- |
| invokeinterface |
| indexbyte1 |
| indexbyte2 |
| count |
| 0 |

TABLE 2

| default opcode = xB8 (184) |
| --- |
| invokestatic |
| indexbyte1 |
| indexbyte2 |

Table 1 illustrates the format of the Java™ invokeinterface instruction. The instruction has one opcode (invokeinterface), followed by four operands. The opcode length is thus five. Table 2 illustrates the format of the Java™ invokestatic instruction. The instruction has one opcode (invokestatic), followed by two operands. The opcode length is thus three. Alternatively, the length of an opcode could be defined as one less than the number of data units required to advance to the next opcode.

Figure 2A:
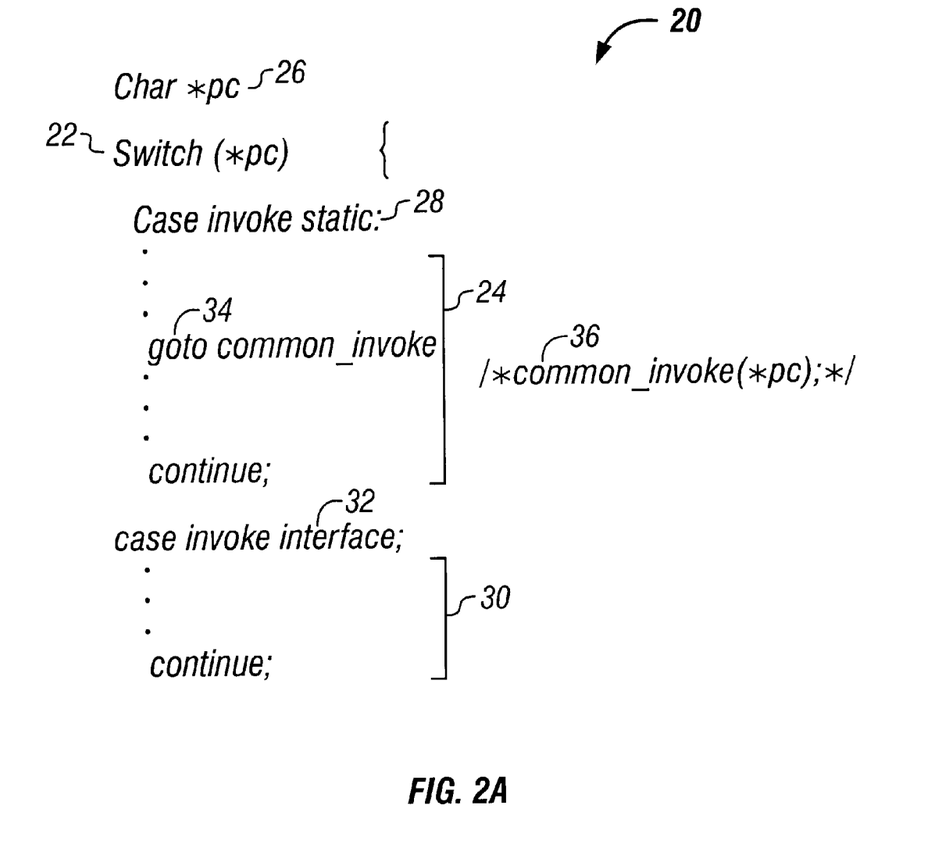
FIG. 2A is a code sample that illustrates one application for opcode numbering in accordance with one embodiment of the present invention.

Turning now to FIG. 2A, a code sample illustrating one application for opcode numbering is presented. The code sample 20 includes a switch statement 22. Code segment 24 is executed when the program counter (PC) 26 evaluates to invokestatic 28 and code segment 30 is executed when the PC 26 evaluates to invokeinterface 32. Code segment 24 includes a branch to common_invoke 34, which represents a program unit callable by many other program units. Those of ordinary skill in the art will recognize there are many other ways to branch to common code, such as the call statement indicated at reference numeral 36. When in code segment 30, the last opcode is known, since code segment 30 can only be executed when the PC 26 evaluates to invoke_interface 32. A program compiler, optimizer or interpreter may take advantage of this information. For example, Java™ classfiles contain many instructions. Each instruction includes an opcode, followed by the operands associated with each opcode. An application that reads an opcode knows how many operands to read based on the opcode. Code to read the appropriate number of operands may be generated in this case, rather than generating code that both (1) uses the opcode to determine how many operands to read and (2) reads the operands.

However, less information is available within the context of a common program unit like common_invoke 34. The last opcode is not known within the common invoke program unit 34, since the program unit 34 has no knowledge of who invoked it. Typically, information specific to the operand is obtained via relatively inefficient mechanisms, such as a table look-up based on the opcode. The present invention avoids this inefficiency by numbering opcodes such that meta-data is encoded in the opcodes themselves.

Figure 2B:
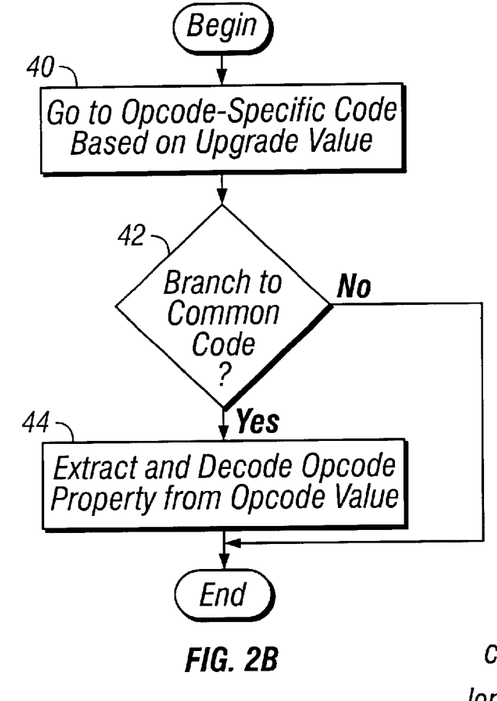
FIG. 2B is a flow diagram that illustrates one application for opcode numbering in accordance with one embodiment of the present invention.

Turning now to FIG. 2B, a flow diagram that illustrates one application for opcode numbering in accordance with one embodiment of the present invention is presented. At reference numeral 40, program execution begins executing opcode-specific code based upon an opcode value. At reference numeral 42, a check is made to determine whether program execution should branch to common code. If program execution does branch to common code, an opcode property is obtained by extracting and decoding the property from the opcode value at reference numeral 44. If program execution has not branched to common code, there is no need to extract and decode opcode properties, since the opcode properties are known based upon the context of the current execution state.

According to one embodiment of the present invention, the length is encoded in the three MSBs of the opeode. Thus, the binary representation for the invokestatic opcode would be 011xxxxx, where "011" represents the length. This would mean that the invokestatic opcode and other opcodes having the same length could take on any value between 3*(256/8)=96 (x60) and 4*(256/8)−1=127 (x7F). Likewise, the invokeinterface command would have a binary representation of 101xxxxx. The invokeinterface opcode and other opcodes having the same length could take on any value between 5*(256/8)=160 (xA0) and 6 *(256/8)−1=191 (xBF).

Figure 3A:
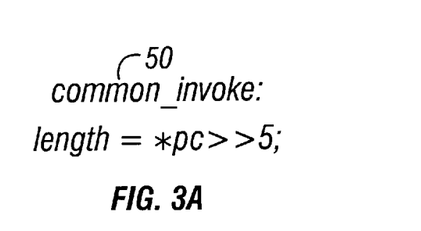
FIG. 3A is a code sample that illustrates extracting an opcode property according to one embodiment of the present invention.

Turning now to FIG. 3A, extracting an opcode property according to the above embodiment is illustrated using C code. At reference numeral 50, the opcode length is assigned a value equal to the current opcode right-shifted by five bits. This statement will extract the three MSBs from the opcode.

Figure 4:
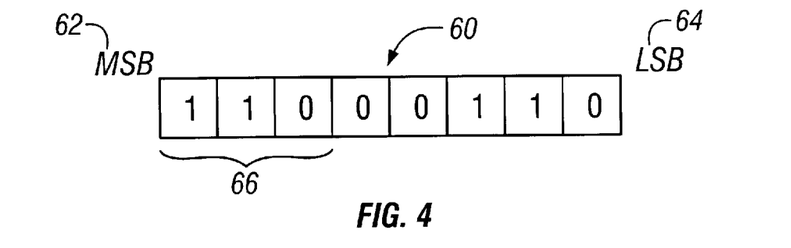
FIG. 4 is a block diagram that illustrates opcode numbering in accordance with one embodiment of the present invention.

Turning now to FIG. 4, a block diagram that illustrates opcode numbering according to the above embodiment is presented. Eight bits represent the opcode 60. Bit 62 is the most significant bit (MSB) and bit 64 is the least significant bit. The three MSBs 66 represent a property of the opcode. Accordingly, the property may represent $2^3$=eight different values. Table 3 illustrates the valid opcode range for each meta-data value in accordance with this embodiment of the present invention.

TABLE 3

| Meta-Data | Opcode Range (Hex) |
|---|---|
| 0 | 00 ... 1F |
| 1 | 20 ... 3F |
| 2 | 40 ... 5F |
| 3 | 60 ... 7F |
| 4 | 80 ... 9F |
| 5 | A0 ... BF |
| 6 | C0 ... DF |
| 7 | E0 ... FF |

The above embodiment allocated three bits to represent length values including length three and length five. Those of ordinary skill in the art will recognize that a smaller number of bits could be used in systems having a smaller number of opcode lengths. For example, suppose all opcodes had a length of either three or five. In this case, only one bit would be required to represent the two opcode lengths. The value zero could represent length three, and the value one could represent the length five. In such a system, a property would need to be extracted from the opcode, and then the value extracted would be decoded to obtain the property. Using the above example, if the value zero is extracted, this value would be decoded to obtain a length of three.

Figure 3B:
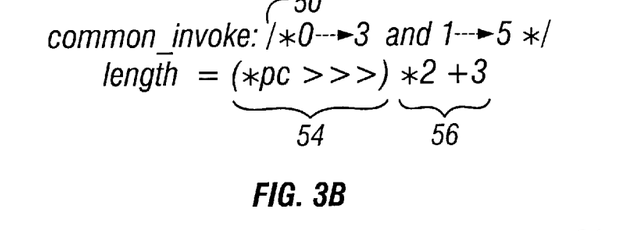
FIG. 3B is a code sample that illustrates extracting and decoding an opcode property according to one embodiment of the present invention.

Turning now to FIG. 3B, extracting and decoding an opcode property according to the above example is illustrated using C code. In the example, the opcode length is encoded in the MSB of the opcode. At reference numeral 54, the opcode property is extracted by right-shifting the current opcode by seven bits to obtain the MSB. The part of the statement indicated by reference numeral 56 decodes the opcode length by multiplying the MSB by two and adding three. Thus, a MSB of zero indicates a length of three and a MSB of one indicates a length of five.

Figure 5:
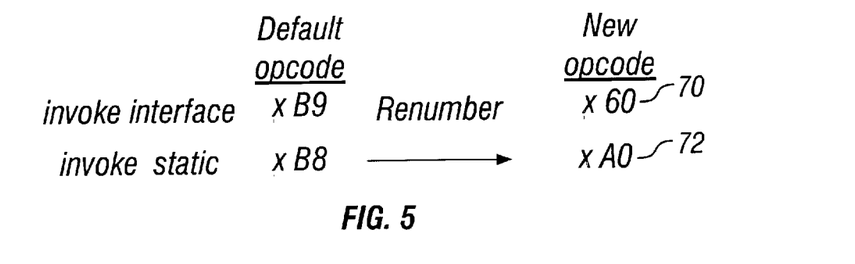
FIG. 5 is a diagram that illustrates renumbering opcodes in accordance with one embodiment of the present invention.

Turning now to FIG. 5, renumbering opcodes in accordance with one embodiment of the present invention is presented. As discussed above, the valid opcode range for invokeinterface (length=three) in this embodiment is x60 to x7F. Accordingly, x60 (70) is selected as the new opcode for invokeinterface. Likewise, the valid opcode range for invokestatic (length=five) in this embodiment is xA0 to xBF. Accordingly, xA0 (72) is selected as the new opcode for invokestatic. The particular opcode values chosen are not important. Any value within the valid range would suffice.

The above embodiment provides for relatively efficient code generation and code execution. The opcode length may be obtained with a shift operation, rather than executing additional instructions to obtain the same information by other means such as a table look-up.

Assigning new opcode values for every opcode is not required. However, multiple opcodes cannot have the same opcode value. Thus, any conflicts between default opcode values and new opcode values must be resolved. In the above example, x60 (70) was selected as the new value for invokeinterface. However, x60 (70) is also the default opcode value for iadd. Thus, the iadd opcode must be assigned a new value. Similarly, the new value for invokestatic (xA0) conflicts with the default opcode value for if_icompare. Thus, the if_icompare opcode must be assigned a new value as well.

Figure 6A:
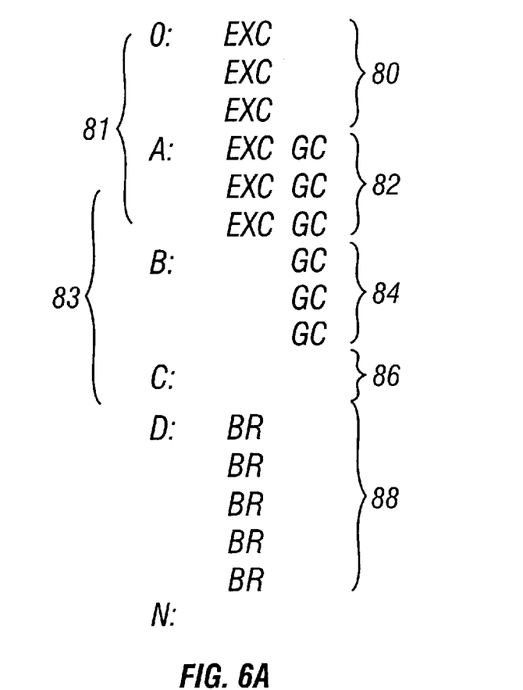
FIG. 6A is a block diagram that illustrates numbering opcodes in accordance with one embodiment of the present invention.

Turning now to FIG. 6A, another method for opcode numbering in accordance with one embodiment of the present invention is presented. According to this embodiment, opcodes having the same properties are assigned opcode values in the in this way. In the present example, three boolean properties are called EXC, GC and BR. Opcode range 80 is reserved for opcodes having the EXC property but not any other defined property. Opcode range 81 is reserved for opcodes having at least the EXC property. Opcode range 82 is reserved for opcodes having both the EXC and the GC properties. Opcodes in range 83 have at least the GC property. Opcodes in range 84 have the GC property but not any other defined property. Opcodes in range 86 have none of the three defied properties and opcodes in range 88 have the BR property.

According to the above embodiment of the present invention, the opcode properties are encoded in all opcodes, not a subset of opcodes. Thus, "extracting" the opcode properties simply uses the entire opcode value and "decoding" the opcode properties requires a comparison of all the bits comprising the opcode.

Figure 6B:
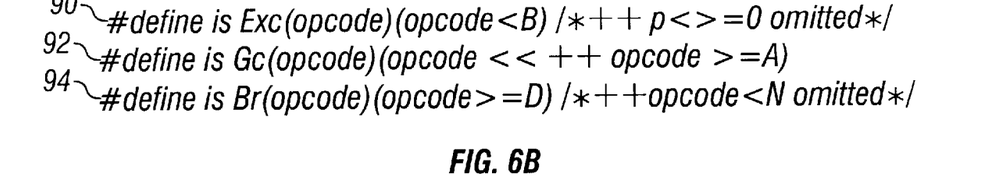
FIG. 6B is a code sample illustrating decoding opcode properties in accordance with one embodiment of the present invention.

FIG. 6B includes three C code samples that illustrate decoding properties according this embodiment of the present invention. Code sample 90 determines whether an opcode has the EXC property based upon whether the opcode value is less than opcode value B. Code sample 92 determines whether an opcode has the GC property based upon whether the opcode value is less than opcode value C and greater than or equal to opcode value A. Code sample 94 determines whether an opcode has the BR property based upon whether the opcode value is greater than or equal to opcode value D. Note that tests for properties EXC and BR require only one comparison. This is because the opcode range containing the EXC property includes the lowest range of the entire opcode range and the opcode range containing the BR property includes the highest range of the entire opcode range. In other words, the opcode values are always greater than zero and less than N.

The use of three properties in the above embodiments is not intended to be limiting in any way. Those of ordinary skill in the art will recognize that the present invention may be used to number opcodes such that fewer than or more than three properties are represented by separate opcode ranges.

Those of ordinary skill in the art will recognize that there are many other ways of encoding an opcode property in the opcode. For example, the opcodes could be numbered such that the opcode property is obtained by subtracting a number from the opcode, or by adding a number to the opcode. Alternatively, the opcodes could be encoded such that the opcode property is obtained by performing modulus arithmetic on the opcode and assigning the opcode length to the remainder of the modulus operation.

The above description with respect to the Java™ programming language is not intended to be limiting in any way. Those of ordinary skill in the art will recognize that the invention may be applied to other languages as well. In addition, those of ordinary skill in the art will recognize that the invention may be applied to opcodes of various sizes. For example, the invention may be applied to systems having 16 or 32 bit opcodes.

FIGS. 7A through 11B illustrate several ways to number opcodes in accordance with the present invention. The figures and the accompanying description are provided for illustrative purposes only and are not intended to be limiting in any way. In some embodiments of the present invention described below, a runtime system loads and executes opcodes that have been renumbered. In other embodiments of the present invention, a runtime systems loads opcodes, renumbers the opcodes and then executes the renumbered opcodes. In each of these embodiments, opcodes are optimized by renumbering them at some point before a runtime system such as a JVM executes them.

Figure 7A:
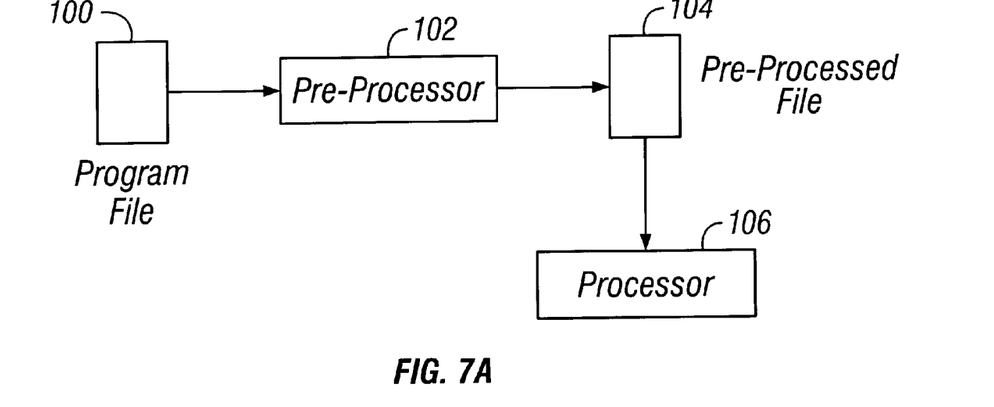
FIG. 7A is a block diagram that illustrates pre-loading program files in accordance with one embodiment of the present invention.

Turning now to FIG. 7A, a block diagram that illustrates pre-loading program files in accordance with one embodiment of the present invention is presented. At least one program file 100 is pre-processed by pre-processor 102. The program file 100 may be any file including opcodes. The pre-processor 102 renumbers the opcodes such that at least one opcode property is encoded in at least one opcode, and creates at least one pre-processed file 104. The pre-processed program file 104 is loaded and executed by a processor 106. Processor 106 may be, for example, an interpreter or a runtime system.

Figure 7B:
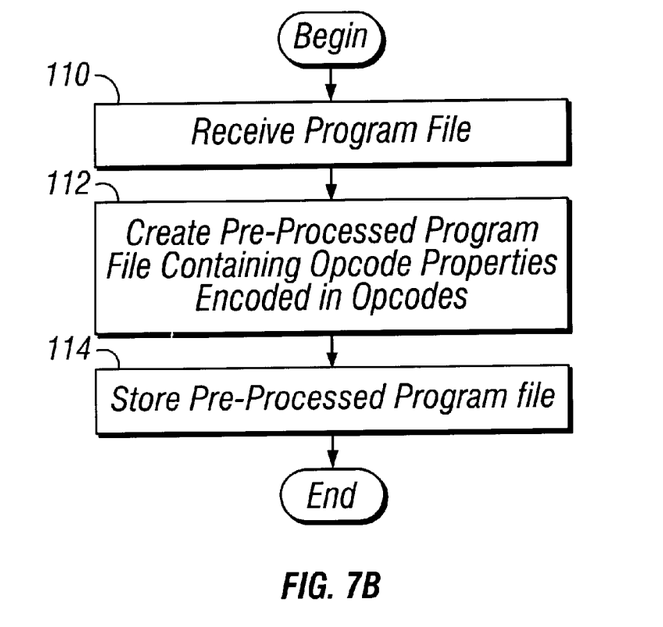
FIG. 7B is a flow diagram that illustrates pre-loading program files in accordance with one embodiment of the present invention.

Turning now to FIG. 7B, a method for pre-loading program files in accordance with one embodiment of the present is illustrated. At reference numeral 110, a program file is received. At reference numeral 112, the program file is processed to create a preprocessed file containing opcodes numbered such that at least one opcode property is encoded in at least one opcode. At reference numeral 114, the preprocessed program file is stored to a computer-readable medium.

Figure 8A:
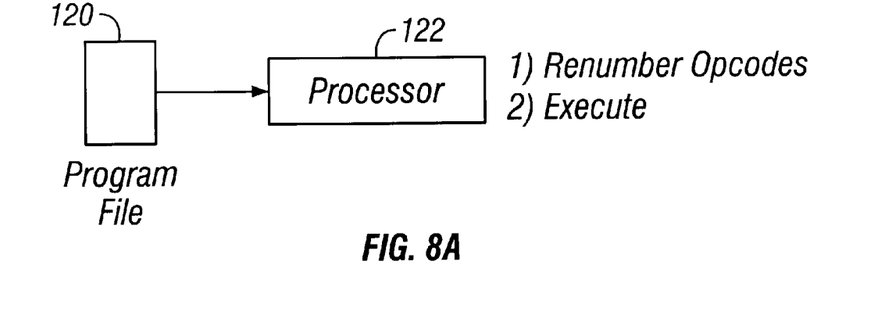
FIG. 8A is a block diagram that illustrates executing program files in accordance with one embodiment of the present invention.

Turning now to FIG. 8A, a block diagram that illustrates executing program files in accordance with one embodiment of the present invention is presented. A processor 122 loads a program file 124, renumbers the opcodes such that at least one opcode property is encoded in at least one opcode, and makes the modified program file available for execution. Processor 122 may be, for example, an interpreter or a runtime system.

Figure 8B:
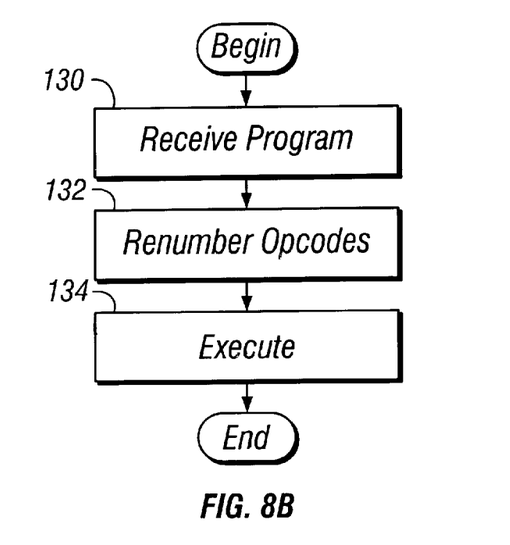
FIG. 8B is a flow diagram that illustrates executing program files in accordance with one embodiment of the present invention.

Turning now to FIG. 8B, a method for executing program files in accordance with one embodiment of the present is illustrated. At reference numeral 130, a program file is received. At reference numeral 132, opcodes within the program file are renumbered such that at least one opeode property is encoded in at least one opcode. At reference numeral 134, the program file is made available for execution.

Figure 9A:
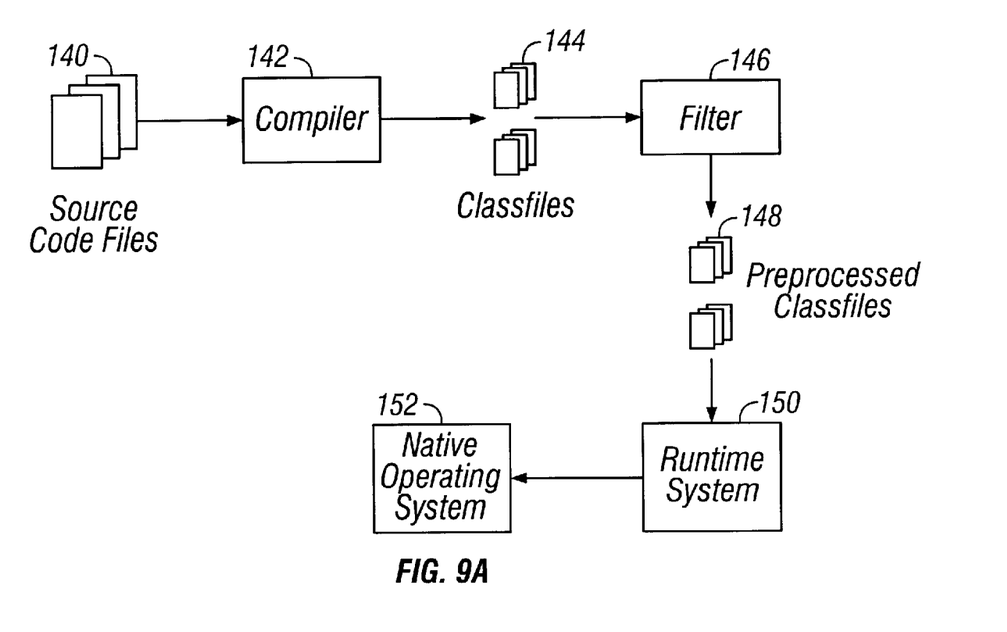
FIG. 9A is a block diagram that illustrates filtering Java™ classfiles in accordance with one embodiment of the present invention.

Turning now to FIG. 9A, a block diagram that illustrates filtering Java™ classfiles in accordance with one embodiment of the present invention is presented. Compiler 142 compiles at least one source code file 140. The compiler 142 creates at least one classfile 144. The filter 146 loads a classfile 144, renumbers the opcodes such that at least one opcode property is encoded in at least one opcode, and creates a preprocessed classfile 148. The preprocessed classfile 148 is read by the runtime system 150. The runtime system 150 makes calls to the native operating system 152.

Figure 9B:
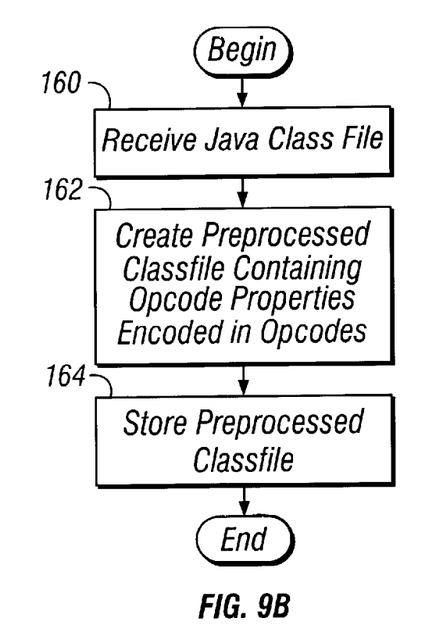
FIG. 9B is a flow diagram that illustrates filtering Java™ classfiles in accordance with one embodiment of the present invention.

Turning now to FIG. 9B, a method for filtering Java™ classfiles in accordance with one embodiment of the present is illustrated. At reference numeral 160, a Java™ classfile is received. At reference numeral 162, the classfile is filtered to create a preprocessed file containing opcodes numbered such that at least one opcode property is encoded in at least one opcode. At reference numeral 164, the preprocessed classfile is stored to a computer-readable medium.

Figure 10A:
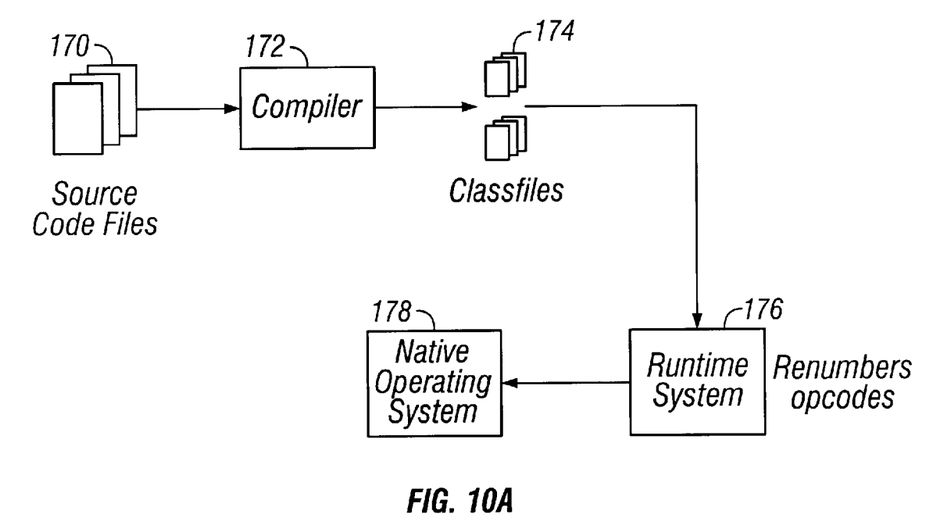
FIG. 10A is a block diagram that illustrates executing Java™ classfiles in accordance with one embodiment of the present invention.

Turning now to FIG. 10A, a block diagram that illustrates executing Java™ classfiles in accordance with one embodiment of the present invention is presented. Compiler 172 compiles at least one source code file 170. The compiler 172 creates at least one classfile 174. The runtime system 176 loads a classfile 174, renumbers the opcodes such that at least one opcode property is encoded in at least one opcode, and makes the modified classfile available for execution. The runtime system 176 makes calls to the native operating system 178.

Figure 10B:
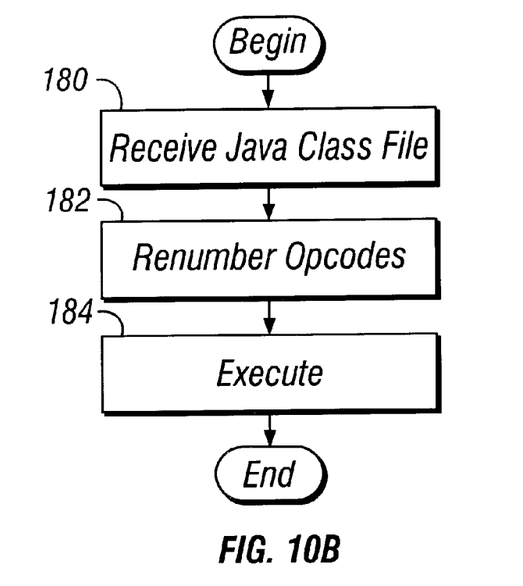
FIG. 10B is a flow diagram that illustrates executing Java™ classfiles in accordance with one embodiment of the present invention.

Turning now to FIG. 10B, a method for executing Java™ classfiles in accordance with one embodiment of the present is illustrated. At reference numeral 180, a Java™ classfile is received. At reference numeral 182, opcodes within the classfile are renumbered such that at least one opcode property is encoded in at least one opcode. At reference numeral 184, the classfile made available for execution.

Figure 11A:
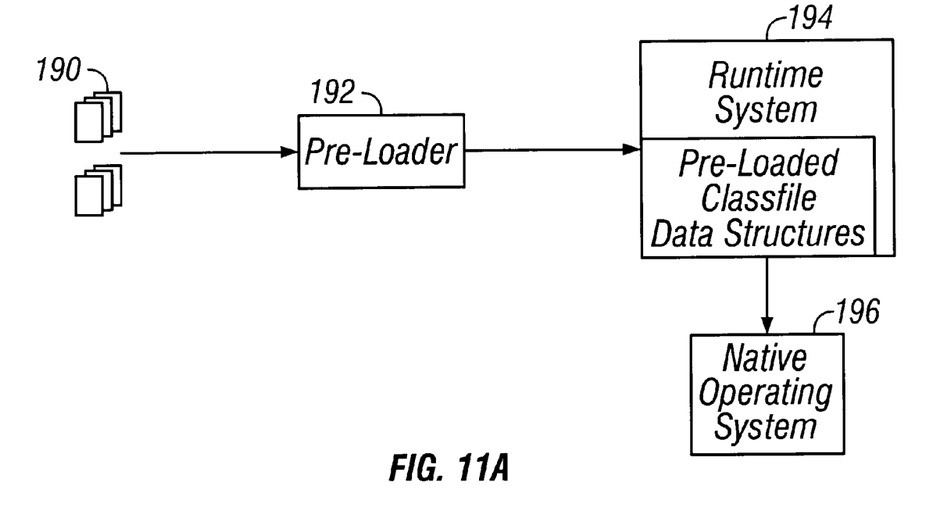
FIG. 11A is a block diagram that illustrates pre-loading Java™ classfiles in accordance with one embodiment of the present invention.

Turning now to FIG. 11A, a block diagram that illustrates pre-loading Java™ classfiles in accordance with one embodiment of the present invention is presented. The preloader 192 loads a classfile 190 and renumbers the opcodes such that at least one opcode property is encoded in at least one opcode. The preloader 192 outputs code and data structures for the runtime system 194. The output may be in the form of .c files or linkable object files. The .c files are compiled into object files and the object files are linked together into the runtime system 194 executable image either at build time or at runtime via dynamic linking. The runtime system 194 makes calls to the native operating system 196.

Figure 11B:
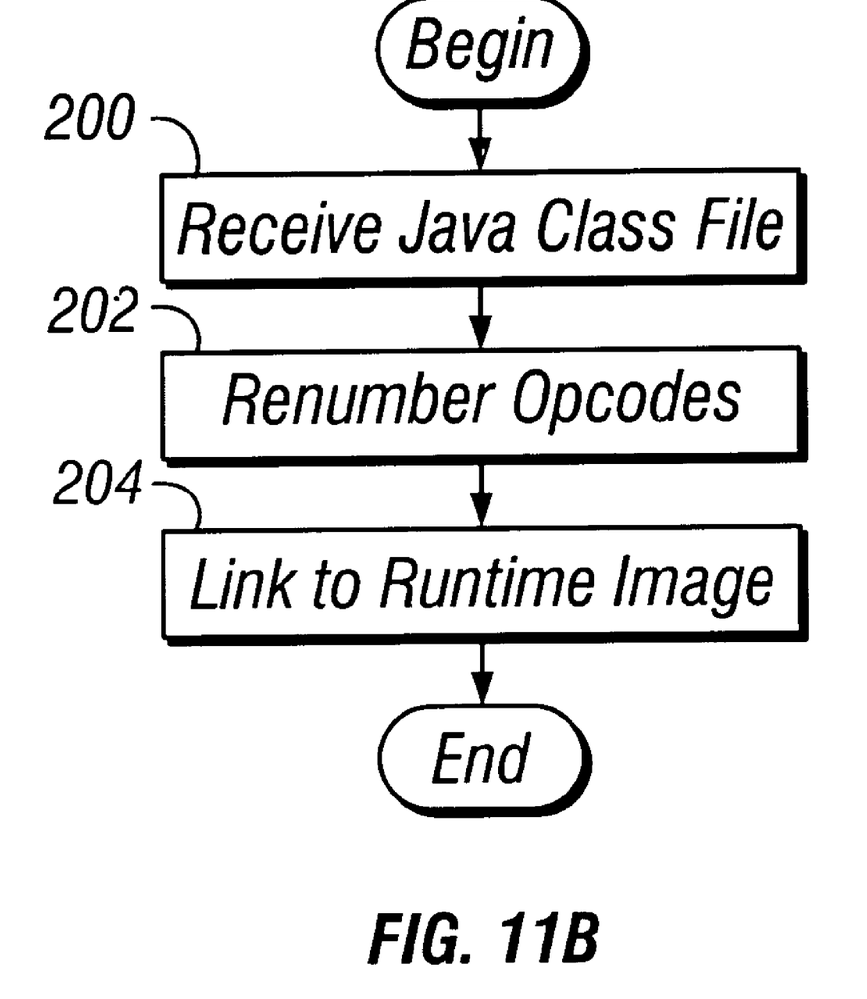
FIG. 11B is a flow diagram that illustrates pre-loading Java™ classfiles in accordance with one embodiment of the present invention.

Turning now to FIG. 11B, a method for pre-loading Java™ classfiles in accordance with one embodiment of the present is illustrated. At reference numeral 200, a Java™ classfile is received. At reference numeral 202, opcodes in the classfile are numbered such that at least one opcode property is encoded in at least one opcode. At reference numeral 204, the classfile is preloaded by outputting code and data structures for the runtime system, thus linking the classfiles to the runtime system.

The description of file formats read by a runtime system such as a JVM is not intended to be limiting in any way.

Those of ordinary skill in the art will recognize that a JVM may read files other than classfiles or pre-processed classfiles. The JVM could read a file having any format that the JVM understands. For example, bytecodes could be converted to C data structures and then compiled into an object file. This object file could be linked into the runtime system. Alternatively, the runtime system could load the object file and runtime system using a form of dynamic linking. In accordance with the present invention, however, the opcodes are renumbered before the JVM executes the opcodes.

As has been described, the present invention provides opcode numbering for meta-data encoding. Although the opcode numbering process can be performed in parallel with the interpretation of the opcode, it is best to perform the numbering process first and then store the results for the subsequent interpretation process. Moreover, even though the renumbering of Java™ opcodes is described in the present disclosure, it is understood by those who are skilled in the art that opcodes from other languages may be renumbered by utilizing the same technique as disclosed. Further, even though eight-bit opcodes are used in the present disclosure for illustrating the invention, the same technique as described is also applicable to other opcodes of other sizes generated by a compilation of a high-level computer program.

According to a presently preferred embodiment, the present invention may be implemented in software or firmware, as well as in programmable gate array devices, Application Specific Integrated Circuits (ASICs), and other hardware.

Thus, a novel method for opcode numbering has been described. While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for including opcode information in an opcode, the opcode including a plurality of bits, the method comprising:

numbering the opcode such that a property of the opcode is represented by at least one bit of the opcode, wherein the bits representing a property of each opcode are contiguous and comprise three bits; and wherein the property comprises the length of a first opcode, the length equal to the number of data units required to advance to a second opcode.

2. A method for including opcode information in an opcode, the opcode including a plurality of bits, the method comprising:

numbering the opcode such that a property of the opcode is represented by at least one bit of the opcode, wherein the bits representing a property of each opcode are contiguous and comprise three bits; and wherein the bits representing a property of each opcode comprise the three most significant bits of the opcode.

3. A method for extracting opcode information from an opcode, the opcode including a plurality of bits, the method comprising:

extracting a property from the opcode, the property including at least one bit, wherein extracting the property further comprises dividing the opcode by a power of two;

wherein opcodes comprise eight bits;

wherein the bits representing a property of each opcode are contiguous and comprise three bits; and wherein the property comprises the length of a first opcode, the length equal to the number of data units required to advance to a second opcode.

4. A method for extracting opcode information from an opcode, the opcode including a plurality of bits, the method comprising:

extracting a property from the opcode, the property including at least one bit, wherein extracting the property further comprises dividing the opcode by a power of two;

wherein opcodes comprise eight bits;

wherein the bits representing a property of each opcode are contiguous and comprise three bits; and wherein the bits representing a property of each opcode comprise the three most significant bits of the opcode.

5. An improved method for pre-loading Java™ classfiles, the method comprising:

receiving a Java™ classfile;

processing said Java™ classfile to create at least one pre-processed classfile, said at least one pre-processed classfile including a plurality of opcodes, said processing including numbering opcodes within said at least one pre-processed classfile such that at least one opcode property is encoded in at least one opcode; and storing said at least one pre-processed classfile on a computer-readable medium.

6. An improved method for executing Java™ classfiles, the method comprising:

receiving a classfile, said classfile comprising a plurality of opcodes;

renumbering opcodes within said classfile such that at least one opcode property is encoded in at least one opcode; and executing said classfile.

7. The method of claim 6 wherein said executing further comprises extracting an opcode property from an opcode such that said opcode property may be used directly.

8. A program storage device readable by a machine, embodying a program of instructions executable by the machine to pre-process a program file, the program file including a plurality of opcodes, the program storage device comprising:

a first module comprising code for causing a machine to receive a program file;

a second module comprising code for causing a machine to process said program file to create at least one pre-processed program file, said at least one pre-processed program file including a plurality of opcodes, said processing including numbering opcodes within said at least one pre-processed program file such that at least one opcode property is encoded in at least one opcode; and a third module comprising code for causing a machine to store said at least one pre-processed program file on a computer-readable medium.

9. A program storage device readable by a machine, embodying a program of instructions executable by the machine to pre-load Java™ classfiles, the program storage device comprising:

a first module comprising code for causing a machine to receive a Java™ classfile;

a second module comprising code for causing a machine to process said Java™ classfile to create at least one pre-processed classfile, said at least one pre-processed classfile including a plurality of opcodes, said processing including numbering opcodes within said at least one pre-processed classfile such that at least one opcode property is encoded in at least one opcode; and a third module comprising code for causing a machine to store said at least one pre-processed classfile on a computer-readable medium.

10. A program storage device readable by a machine, embodying a program of instructions executable by the machine to execute Java™ classfiles, the program storage device comprising:

a first module comprising code for causing a machine to receive a classfile, said classfile comprising a plurality of opcodes;

a second module comprising code for causing a machine to renumber opcodes within said classfile such that at least one opcode property is encoded in at least one opcode; and a third module comprising code for causing a machine to execute said classfile.

11. A method for including opcode information in a first opcode, the first opcode including a plurality of bits, the method comprising:

numbering the opcode such that a length of the first opcode is represented by three contiguous bits of the opcode, wherein the length equals to the number of data units required to advance to a second opcode.

12. A method for including opcode information in an opcode, the opcode including a plurality of bits, the method comprising:

numbering the opcode such that a length of the opcode is represented by three most significant contiguous bits of the opcode.

13. A method for extracting opcode information from a first eight bits opcode, the first opcode including a plurality of bits, the method comprising:

extracting the length of the first opcode, the length including three contiguous bits and equal to the number of data units required to advance to a second opcode; and dividing the first opcode by a power of two.

14. The method of claim 13, wherein the bits representing the length comprise the three most significant bits of the opcode.

15. An apparatus for including opcode information in an opcode, the opcode including a plurality of bits, the apparatus comprising:

means for numbering the opcode such that a property of the opcode is represented by at least one bit of the opcode, wherein opcodes comprise eight bits;

wherein the bits representing a property of each opcode comprise three bits; and wherein the property comprises the length of a first opcode, the length equal to the number of data units required to advance to a second opcode.

16. An apparatus for including opcode information in an opcode, the opcode including a plurality of bits, the apparatus comprising:

means for numbering the opcode such that a property of the opcode is represented by at least one bit of the opcode, wherein opcodes comprise eight bits;

wherein the bits representing a property of each opcode comprise three bits; and wherein the bits representing a property of each opcode comprise the three most significant bits of the opcode.

17. An apparatus for extracting opcode information from an opcode, the opcode including a plurality of bits, the apparatus comprising:

means for extracting a property from the opcode, the property including at least one bit, wherein said means for extracting the property further comprises means for dividing the opcode by a power of two;

wherein opcodes comprise eight bits;

wherein the bits representing a property of each opcode are contiguous and comprise three bits; and wherein the property comprises the length of a first opcode, the length equal to the number of data units required to advance to a second opeode.

18. An apparatus for extracting opcode information from an opcode, the opcode including a plurality of bits, the apparatus comprising:

means for extracting a property from the opcode, the property including at least one bit, wherein said means for extracting the property further comprises means for dividing the opcode by a power of two;

wherein opcodes comprise eight bits;

wherein the bits representing a property of each opcode are contiguous and comprise three bits;

wherein the property comprises the length of a first opcode, the length equal to the number of data units required to advance to a second opcode; and wherein the bits representing a property of each opcode comprise the three most significant bits of the opcode.

19. An apparatus for including opcode information in a first opcode, the first opcode including a plurality of bits, the apparatus comprising:

means for numbering the opcode such that a length of the first opcode is represented by three contiguous bits of the opcode, wherein the length equals to the number of data units required to advance to a second opcode.

20. An apparatus for including opcode information in an opcode, the opcode including a plurality of bits, the apparatus comprising:

means for numbering the opcode such that a length of the opcode is represented by three most significant contiguous bits of the opcode.

21. An apparatus for extracting opcode information from a first eight bits opcode, the first opcode including a plurality of bits, the apparatus comprising:

means for extracting the length of the first opcode, the length including three contiguous bits and equal to the number of data units required to advance to a second opcode; and apparatus dividing the first opcode by a power of two.

22. The apparatus of claim 21, wherein the bits representing the length comprise the three most significant bits of the opcode.

* * * * *